(12) United States Patent
Sivaraman et al.

(10) Patent No.: US 11,263,040 B2
(45) Date of Patent: Mar. 1, 2022

(54) MEASURING HOST UTILIZATION IN A DATACENTER

(71) Applicant: VMware, Inc., Palo Alto, CA (US)

(72) Inventors: Hari Sivaraman, Livermore, CA (US); Uday Pundalik Kurkure, Los Altos Hills, CA (US); Lan Vu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 91 days.

(21) Appl. No.: 16/882,942

(22) Filed: May 26, 2020

(65) Prior Publication Data
US 2021/0373924 A1 Dec. 2, 2021

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4856* (2013.01); *G06F 9/505* (2013.01); *G06F 2009/45562* (2013.01); *G06F 2009/45591* (2013.01); *G06F 2009/45595* (2013.01)

(58) Field of Classification Search
CPC .... G06F 9/45558; G06F 9/4856; G06F 9/505; G06F 2009/45591; G06F 2009/45562; G06F 2009/45595
See application file for complete search history.

(56) References Cited

U.S. PATENT DOCUMENTS

| 2012/0317168 A1* | 12/2012 | Driesen | G06Q 30/06 709/202 |
| 2018/0139148 A1* | 5/2018 | Gamage | H04L 47/822 |
| 2018/0145955 A1* | 5/2018 | Nirwal | H04L 9/08 |

\* cited by examiner

*Primary Examiner* — Sisley N Kim
(74) *Attorney, Agent, or Firm* — Thomas | Horstemeyer LLP

(57) ABSTRACT

Various examples are disclosed for generating heatmaps and plotting utilization of hosts in a datacenter environment. A collector virtual machine can rove the datacenter and collect utilization data. The utilization data can be plotted on a heatmap to illustrate utilization hotspots in the datacenter environment.

20 Claims, 5 Drawing Sheets

MEASURING HOST UTILIZATION IN A DATACENTER

BACKGROUND

Data centers include various physical and virtual components that, when executed, provide web services, cloud computing environments, virtualization environments, as well as other distributed computing systems. For instance, data centers can include hardware and software to provide computer virtualization services, which relate to the creation of a virtualized version of a physical device, such as a server, a storage device, a central processing unit (CPU), a graphics processing unit (GPU), or other computing resources. Data centers can also include virtual machines (VMs), which include emulations of a computer system that can be customized to include a predefined amount of random access memory (RAM), hard drive storage space, as well as other computing resources that emulate a physical machine. The VMs can provide services to end-users or other users in an enterprise setting. For example, a cluster of VMs can provide a virtual desktop infrastructure (VDI) environment to a population of users in the enterprise.

Providing services such as a VDI environment to a population of users can require virtualized components of a computing device, such as a virtual graphics processing unit (vGPU), vCPU, and other resources. User experience can be degraded for certain users who are being served by a VM or a cluster of VMs that are being highly utilized. In a software-defined datacenter (SDDC) or a physical datacenter, it can be difficult to identify the cause of user experience degradation or to identify those VMs that are being highly utilized.

BRIEF DESCRIPTION OF THE DRAWINGS

Many aspects of the present disclosure can be better understood with reference to the following drawings. The components in the drawings are not necessarily to scale, with emphasis instead being placed on clearly illustrating the principles of the disclosure. Moreover, in the drawings, like reference numerals designate corresponding parts throughout the several views.

DETAILED DESCRIPTION

The present disclosure relates to measuring server utilization in hyper-converged infrastructures and other infrastructures such as datacenters or software defined datacenters (SDDC) that provide compute, memory, storage, and network resources and are brought together using integrated hardware. Host machines in a datacenter can execute virtual machines, a cluster of virtual machines, and other applications that are referred to herein as workloads or tasks. Workloads are managed by an administrator and provide services to end users or other entities within an enterprise. For example, workloads can provide virtual desktop infrastructure (VDI) sessions to users of the enterprise. As another example, workloads can provide data processing or software development resources to a team of developers within the enterprise. With varied applications and services provided by a datacenter in an enterprise, certain host machines can be utilized more than others, resulting in certain inefficiencies.

Examples of the disclosure can generate heatmaps that allow utilization of host machines in a datacenter to be monitored and visualized. The heatmap can help an administrator or an automated process to understand which host machines within a datacenter might be overutilized and which servers might be underutilized. This information can facilitate load balancing, power usage, and selecting host machines on which new workloads or requests can be directed. Utilization can be determined by utilizing a virtual machine (VM), which is also referred to herein as a collector VM, that is instrumented to collect utilization metrics from a host machine.

According to some examples, a single collector VM can be created that roves around the host machines in the datacenter to collect utilization data from the hosts. In other examples, multiple collector VM's can be created that rove around a datacenter. A collector VM can be migrated to different host machines on a random walk basis or it can be scheduled to roam the datacenter host machines in a grid-wise or an organized fashion.

Figure 1:
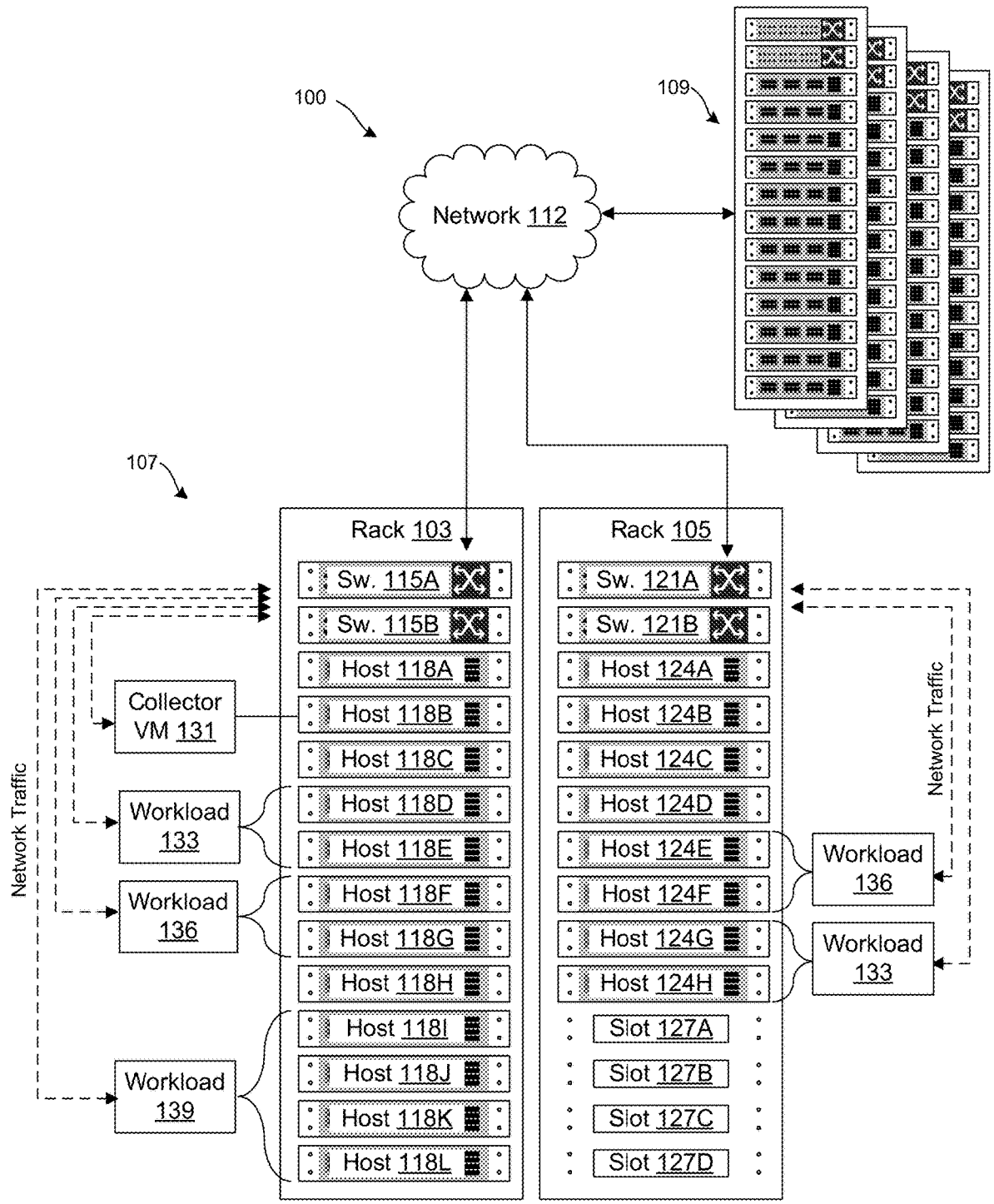
FIG. 1 is a drawing of an example of a datacenter environment according to various embodiments of the present disclosure.

With reference to FIG. 1, shown is an example of a datacenter environment 100. The datacenter environment 100 can have components including racks 103 and 105 of a site 107, and additional racks of a remote site 109, in communication with one another over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks. The network 112 can also include switches, routers, and other network devices. The network devices can include network devices that are held or integrated within racks and network devices that are external to the racks.

In some cases, the rack 103 can be a rack that is part of a hyper-converged infrastructure having compute, memory, storage, and network resources that are provided using integrated and/or preconfigured hardware. In other cases, a rack can be part of a converged infrastructure or another type of infrastructure. In some examples, a portion of a rack, such as a subset of the hosts in the rack, can be considered as a standalone software-defined datacenter (SDDC) of an enterprise. A rack 103 can have a number of switches, or a number of slots for switches or other network devices. For example, the rack 103 can have switches 115A and 115B. The switches 115A and 115B can be top-of-rack switches or other integrated network devices of the rack 103. While not shown, the switches 115 can also be further connected to other switches and network devices of the remote site 109, including spine switches, End-of-Row switches, Middle-of-Row switches, or other switches, routers, and the like. The rack 103 can also include a number of hosts, or a preconfigured number of slots or bays for hosts. For example, the rack 103 can have hosts 118A-118L (collectively, "hosts 118"). Where the rack 103 is part of a hyper-converged infrastructure, each of the hosts 118 can provide compute, memory, storage, and network resources. Where the rack 103 is part of a hyper-converged infrastructure, each of the hosts 118 can provide compute, memory, storage, and network hardware. Each of the hosts 118 can be connected to the network 112 through the switches 115A and 115B. For example, the host 118 can include two NICs connected to the switches 115A and 115B. Individual ones of the hosts 118 can be connected to both a port of the switch 115A and a port of the switch 115B. While the hosts 118 are connected to the network 112 through the switches 115A and 115B, the switches 115A and 115B can be considered a part of the network 112, as can network cards or controllers of the individual hosts.

Similarly, the rack 105 can also include a number of hosts, or a preconfigured number of slots or bays for hosts. For example, the rack 105 can have hosts 124A-124L (hosts 124) as well as slots 127A-127D (slots 127). The slots 127 can accommodate or accept additional hosts to expand the compute, memory, storage, network, and other resources provided by the rack 105. Where the rack 105 is part of a hyper-converged infrastructure, each of the hosts 124 can provide compute, memory, storage, and network resources. Where the rack 105 is part of a hyper-converged infrastructure, each of the hosts 124 can provide compute, memory, storage, and network hardware. Each of the hosts 124 can be connected to the network 112 through the switches 121A and 121B. For example, individual ones of the hosts 124 can be connected to both a port of the switch 121A, and a port of the switch 121B. The switches 121A and 121B can be considered a part of the network 112, as can network cards or controllers of the individual hosts.

For example, each of the hosts 118 and 124 can be a processor-based system, such as a computer system, and can include at least one computing device, at least one storage device, and at least one network device. While referred to in the singular for clarity, multiple computing devices, storage devices, and network devices can be included in each host. The computing device can include a processor circuit, such as one that includes a processor and a memory. The storage devices can include memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The network devices can include network interface controllers or network interface cards (NICs), switches, routers, and other network devices. The hosts can be utilized to perform or execute instructions, including processes, programs, applications, and other tasks that can be utilized in concert, for example, using software like the management service 130 (FIG. 2), VMware vSphere®, vSAN®, NSX®, ESX®, ESXi®, and other virtualization software or tools.

The rack 103 and the rack 105 can be part of the site 107, which can be considered a local site associated with a larger datacenter or SDDC. Additional racks can be provided at the site 107, which can be considered a remote site 109. In some cases, one or more of the sites can be provided by a service that provides compute, memory, storage, network, and other resources to an enterprise or another customer of the service. In other cases, one or more of the sites can also be owned or operated by the enterprise. The workload domains at the remote site 109 can be mirrors or backups of the management cluster 129 (FIG. 2) and the workload domains 133, 136, and 139 for disaster recovery. In some cases, backups at the remote site 109 can be in a similar configuration as the active workload domains at the site 107. For example, the workload domains can utilize a similar number of switches and can be provided similar network configuration so the backup or mirror can perform the same as the active workload domains at the site 107. In other examples, backup workload domains can be in a different configuration, and may provide a mirror or backup of all tasks, programs, data, and the like within an operational infrastructure, but may not be an exact infrastructural match with respect to the compute and network resources. In other cases, the remote site 109 can instead include other workload domains or can provide additional hosts for the management cluster 129 and the workload domains 133, 136, and 139, rather than being a backup or mirror of the site 107.

Software instructions can provide and assign resources using containers called workload domains. A workload domain can be a physical collection of compute, memory, storage, and network resources that provide uniform characteristics to applications and tasks such as security, data protection, performance, availability, and modular expandability. A workload domain can perform or execute tasks, including applications, programs, and other instructions. Workload domains can provide infrastructure such as a service (IaaS), a platform as a service (PaaS), and a desktop as a service (DaaS)/virtual desktop infrastructure (VDI). These can be considered workload domain types, and workload domain types can further include test and development workload domain types, production workload domain types, and other domain types that can include any of these services or a combination of these and other services. Each domain type can be associated with a particular set of policies, settings, and capabilities for the workload domain. While an established workload domain can be assigned any desired task, workload domains can have a particular purpose or usage characteristics. In other words, there can be various types of workload domains. During the creation of workloads, the application or task requirements of the workload can be translated, for example, by the management service 130, to physical infrastructure requirements including a number of hosts to assign to the workload, each having compute, memory, storage, and network devices. The applications, tasks or other functionalities can be performed or brought up on the chosen hardware.

For example, types of workload domains can include production workload domains, test and development workload domains, management workload domains or management clusters, disaster recovery workload domains, and others. Each type of workload domain can be assigned a particular priority, such that one type of workload domain is a lower priority than another workload. Each type of workload domain can also be assigned a particular expected bandwidth. Workload domain priority can be assigned, for example, as high-priority, low-priority, and a numerical or other value-based priority. The priority of workload domains can be compared to other workload domains, and the lowest-priority workload domains can be throttled if throttling becomes necessary in order to maintain network resource availability for higher-priority workload domains. Moreover, individual workload domains of any type can be set to a particular priority to meet the needs of an enterprise.

A production workload domain can, for example, be used for providing virtual desktop infrastructure (VDI). Users can access typical desktop environments, operating systems, applications, and the like. Production workload domains can be high-priority and can require dedicated bandwidth, or fewer network interruptions, to provide the best customer experience. It should be noted that while production workload domains can be high-priority workload domains, priority of a workload domain can be set to any level of priority. Some production workload domains can be higher than other production workload domains, or a customer may desire to set a certain production workload domain as a low-priority workload as compared to other types of workloads. Production workload domains can be assigned to hosts that are relatively nearby to target users, for example, on-site with target users, or at a remote site 109 having a high-quality network connection for target users.

A test and development workload domain can, for example, be used for providing Infrastructure as a Service (IaaS), Software as a Service (SaaS), and other services and tasks for test and development. For example, test and development workload domains can provide an environment with infrastructure components, storage solutions, and applications for test and development, as well as, handle tasks including system maintenance and software execution. While test and development workload domains can be assigned any desired priority, these domains can generally be regarded as a lower priority than production workload domains.

A disaster recovery workload domain can provide IaaS, SaaS, and other services and tasks for disaster recovery. For example, disaster recovery workload domains can provide an environment with infrastructure components, storage solutions, and applications for disaster recovery, temporary or permanent replacement of other workload domains, recovery of other workload domains, system maintenance, and the like. While disaster recovery workload domains can be assigned any desired priority, these domains can generally be regarded as a lower priority than production workload domains. However, since disaster recovery workload domains can be used for temporary or permanent replacement for production workload domains, once reassigned, they may assume or be reassigned to the priority of the workload domain that they are replacing.

A management workload domain can be used for providing software defined data center (SDDC) functionality. The SDDC functionality can be provided through policy-based data center management software. The SDDC functionality can allow administrators to centrally monitor and administer all workload domains, applications, and tasks across individual sites or multiple sites, including local hardware, private cloud, public cloud, and hybrid cloud deployments. Administrators can deploy and manage workload domains in physical, virtual, and cloud environments with a unified management experience through a management workload domain executing SDDC functionality. Management workload domains can also be referred to as a management cluster. While a management workload domain can be assigned any desired priority, it can generally be regarded as a high-priority workload domain.

These types of workload domains are illustrative, and any type or naming convention can be used for types of workload domains. For example, new workload domains can be assigned to a particular preconfigured workload domain type, or a user-created custom workload domain type. Also, existing workload domains can execute particular applications, and can be assigned to a type after they are initially established by analysis of the applications and tasks performed by the particular workload domain, for example, if they match a profile of a particular preconfigured workload domain type or a user-created custom workload domain type. While certain functionalities are discussed regarding particular types of workload domains, any of the functionalities and applications can also be provided by these and other workload domains. For example, internet of things (IoT) functionalities, AirWatch® functionalities, VMware® Photon OS, and other functionalities and application types can be provided. During the creation of workload domains, the applications and tasks to be performed can be translated to physical infrastructure requirements including compute, memory, storage, and network requirements. In some cases, the applications and tasks performed and the compute, memory, storage, and network requirements can be used to determine a particular host to assign to the workload domain, at creation.

A single physical rack can support multiple workload domains. Also, a single workload domain can be assigned hosts from multiple different physical racks, and hosts from multiple sites or locations. For example, any of the hosts 118, hosts 124, or hosts of the remote site 109 can be assigned to a workload domain. A single workload domain can be assigned to multiple hosts 118 of the rack 103. Alternatively, a single workload domain can be assigned a host from the rack 103, a host from the rack 105, and a host from the remote site 109. It should be noted that in some cases, the site 107 can be a private cloud site, and the remote site 109 can be a public cloud site, such that the datacenter environment 100 can be considered a hybrid cloud environment. In other cases, each of the sites 107 and 109 can be private, or each of the sites 107 and 109 can be public.

In some examples of a SDDC, a management cluster can be deployed to provide the physical resources to execute a workload that includes a SDDC and other functionality that can allow administrators to centrally monitor and administer all workload domains, applications, and tasks across individual sites or multiple sites, including local hardware, private cloud, public cloud, and hybrid cloud deployments.

The hosts 118D and 118E of the rack 103 can be assigned to a workload domain 133. The workload domain 133 can provide the physical resources to execute functionality or a workload including applications and tasks. The physical hosts 118D and 118E can be connected to the network 112 through the switches 115A and 115B. Accordingly, each of the hosts 118D-118E can be connected to a port of the switch 115A and to a port of the switch 115B. The hosts 124G and 124H of the rack 105 can also be assigned to the workload domain 133. The physical hosts 124G and 124H can be connected to the network 112 through the switches 121A and 121B. Each of the hosts 124G and 124H can be connected to a port of the switch 121A and to a port of the switch 121B. Accordingly, hosts from different racks can be assigned to a single workload domain 133. In some cases, high-bandwidth workload domains and/or high-priority workload domains can be assigned hosts from different racks and from different sites.

The assignment of the hosts 118D, 118E, 124G and 124H to the workload domain 133 can also be based on available network resources of switches 115 and 121 through which the hosts are connected to the network 112. The assignment of these hosts can also be further based on an expected bandwidth requirement or actual bandwidth requirement of the workload domain 133. For example, an expected bandwidth can be selected by a user upon workload domain creation or can be determined based on a selected type of the workload domain 133. An expected bandwidth can also be determined using the tasks or functionalities that are selected to be performed by the workload domain 133. An actual bandwidth requirement can be a measured bandwidth used by the workload domain 133, for example an average, mean, or mode bandwidth usage for the workload domain 133 over an amount of time.

Likewise, the hosts 118F and 118G of the rack 103 can be assigned to a workload domain 136 that provides the physical resources to execute functionality or a workload including applications and tasks. The physical hosts 118F and 118G can be connected to the network 112 through the switches 115A and 115B. The hosts 124E and 124F of the rack 105 can also be assigned to the workload domain 136. The physical hosts 124E and 124F can be connected to the network 112 through the switches 121A and 121B. The assignment of these hosts to the workload domain 136 can also be based on available network resources of switches 115 and 121 through which the hosts are connected to the network 112, as well as an expected bandwidth requirement or actual bandwidth requirement of the workload domain 136.

The hosts 118I-118L of the rack 103 can be assigned to a workload domain 139 that provides the physical resources to execute functionality or a workload including applications and tasks. The physical hosts 118I-118L can be connected to the network 112 through the switches 115A and 115B of the rack 103. Further, the host 118H of the rack 103, and the hosts 124A-124D of the rack 105 can be unassigned and can later be assigned to a workload domain using the available network resources of switches 115 and 121 through which the hosts are connected to the network 112 as well as an expected bandwidth requirement or actual bandwidth requirement.

The collector VM 131 (FIG. 2) can be deployed on a host 118 within the rack 103 of a datacenter. The collector VM 131 can collect utilization data from the host 118, which can be reported to a management service 130 (FIG. 2) or management cluster. The utilization data can be collected from a hypervisor or other service running on the host 118 to manage execution of the workloads on the host 118. The utilization data can also be collected from workloads or VMs running on the host 118 on which the collector VM 131 is deployed. The utilization data can include virtual CPU (vCPU) usage, disk usage, memory usage, network input-output operations per second (TOPS), network bandwidth usage, and other hardware utilization metrics. The collector VM 131 can report the collected utilization data from a host 118 on which it is executing to a management service 130. The management service 130 can calculate a utilization metric from the collected utilization data, which can be plotted, visualized, and analyzed to identify remedial actions that can be taken to more effectively or efficiently operate a datacenter.

Figure 2:
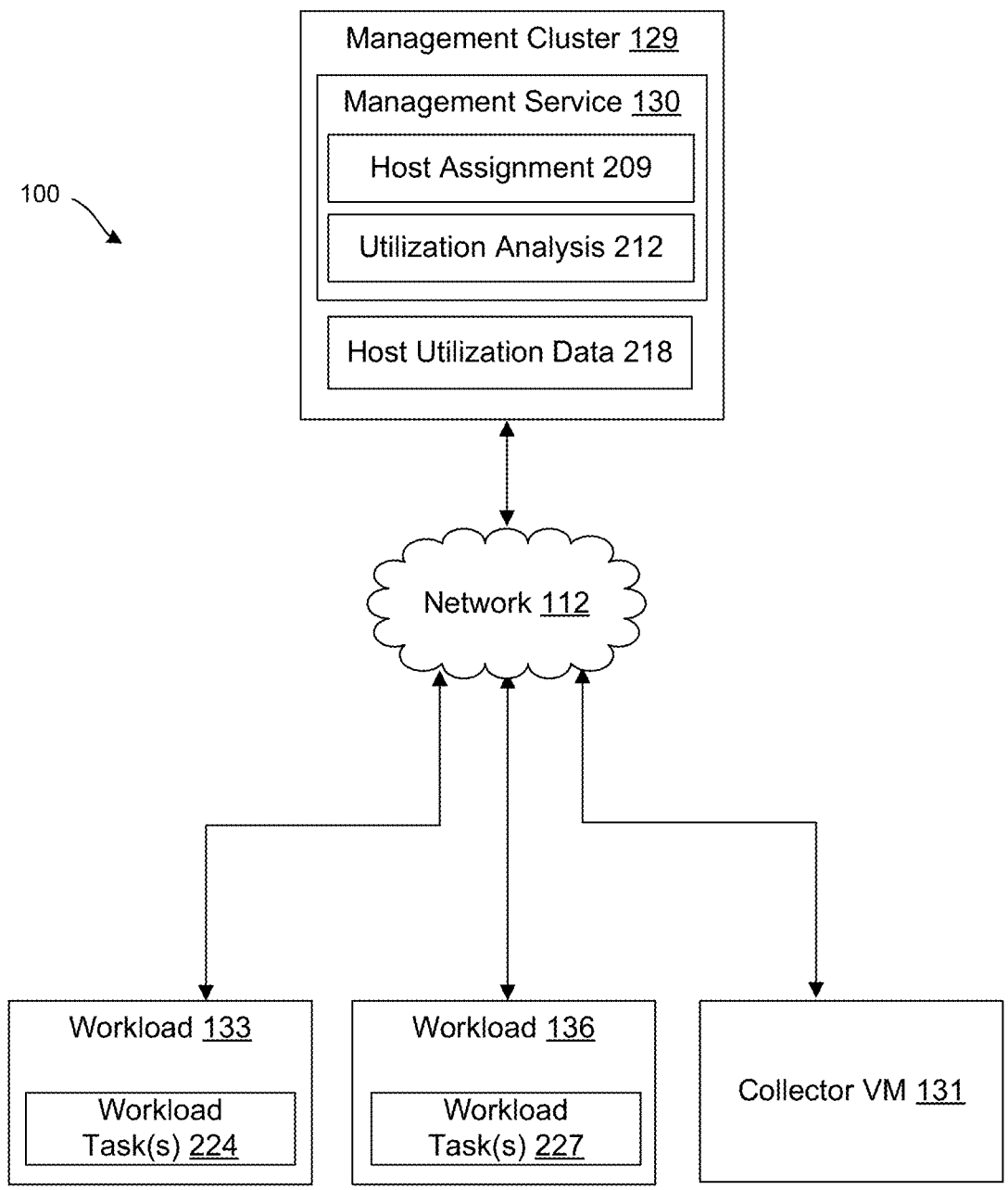
FIG. 2 is an example of a datacenter environment according to various embodiments of the present disclosure.

Referring to FIG. 2, shown is an example of components of the datacenter environment 100 in communication through the network 112. The management cluster 129 can represent a host 118, a VM, or a cluster of VM's that can manage or oversee the operations of a SDDC of an enterprise. The management cluster 129 can execute a management service 130. VMware vSphere®, vSAN®, NSX®, ESX®, ESXi®, and other virtualization software and tools can also be executed in the management cluster 129 and the various hosts, and can work in concert with, and can be considered part of, the management service 130. The management service 130 can allow administrators to centrally monitor and administer all workload domains, applications, and tasks across individual sites or multiple sites, including local hardware, private cloud, public cloud, and hybrid cloud deployments. Administrators can deploy and manage workload domains in physical, virtual, and cloud environments with a unified management experience through at least one user interface generated by management cluster 129 executing the management service 130. For example, administrators can create new workload domains through the user interface of the management service 130. Additionally, hosts can be manually assigned and shifted within the available hosts through the user interface of the management service 130. Administrators can configure and change properties, settings, and other configurations for particular workload domains. For example, a particular workload domain can be configured to have a certain priority, such as a low-priority workload domain setting or a high-priority workload domain setting. A particular workload domain can be further manually set to have a particular expected bandwidth requirement.

The workload domain 133 can include workload tasks 224. The workload tasks 224 can include programs, applications, instructions, and other functionalities that are executed by the workload domain 133. For example, VDI functionalities, IaaS functionalities, SaaS functionalities, IoT functionalities, VMware® Photon OS, AirWatch®, and other functionalities and application types can be provided by executing the workload tasks 224 using the workload domain 133. The workload tasks 224 and other files and data can be stored and distributed on any of the data stores or other memories of the various hosts 118D, 118E, 124G, and 124H assigned to the workload domain 133. Likewise, the workload domains 136 can include workload tasks 227 and other data stored and distributed on any of the data stores or other memories of the various hosts assigned to the workload domain 136.

The management service 130 can include subroutines, modules, or applications including a host assignment application 209 and a utilization analysis application 212. The host assignment application 209 and the utilization analysis application 212 can alternatively be independently executed applications or tasks that can run on any of the hosts, for example, hosts assigned to the management cluster 129. The management cluster 129 can store the management service 130, the host assignment application 209, the utilization analysis application 212, and additional applications or programs in a data store of the management cluster 129. The management cluster 129 can also store host utilization data 218 in the data store of the management cluster 129. The data store can be representative of multiple disks, drives, and other memories that are included in any of the hosts 118A-118C that are assigned to the management cluster 129.

The host utilization data 218 can include information about the utilization of the hosts 118 in a datacenter associated with an enterprise. The information can be collected by one or more collector VMs 131. A collector VM 131 can be a VM running one or more applications or services that are instrumented to collect data from a host 118. In one example, the management service 130 can specify a host 118 in a datacenter on which the collector VM 131 can begin execution. The collector VM 131 can obtain initial information about the host 118, such as available memory, available CPU, available vCPU, available GPU resources, available disk space, and other information that might be available to any VM running on the host 118.

Additionally, the collector VM 131 can also be provided elevated privileges to obtain data from the hypervisor or other services running on a host 118. The data can include network latency with individual client devices being served by a workload, a framerate observed by a client device being served a VDI desktop session, I/O responsiveness for a VDI session, and other user-experience related metrics that can be tracked by workloads and provided to the collector VM 131 upon request.

The collector VM 131 can report collected utilization and user-experience data from hosts and from the workloads running on hosts to the management service 130. The management service 130 can store the collected data in the host utilization data 218. Additionally, the management service 130 can calculate a utilization metric that can be plotted in a user interface for an administrator, as will be discussed and shown in the discussion of FIGS. 3-4.

The management service 130 can also generate a roving schedule for the collector VM 131. A roving schedule can specify that the collector VM 131 should be migrated from host 118 to host 118 within a datacenter to collect utilization data from multiple hosts and workloads within the data center so that host utilization data 218 from multiple hosts 118 can be collected and analyzed. The collector VM 131 can be migrated across the datacenter using various methodologies. In one example, the collector VM 131 can be migrated randomly across the datacenter to different hosts 118. In another example, the collector VM 131 can be systematically migrated across the hosts 118 in the datacenter so that each host 118 in the datacenter is visited by the collector VM 131 in sequence. In one example, the collector VM 131 can be migrated in a grid-wise fashion throughout the datacenter. In another example, the collector VM 131 can be migrated in order from the most utilized host 118 to the least utilized host 118 according to the previously calculated utilization metric for the datacenter.

The roving schedule can be provided to the collector VM 131, which can then rove from host 118 to another host 118 within the datacenter. In another example, the management service 130 can generate the roving schedule and cause the collector VM 131 to be migrated from host 118 to a different host 118 according to the generated roving schedule. The management service 130 can cause the collector VM 131 to be migrated by issuing a migration command that causes the collector VM 131 to perform a cleanup operation that deletes or backs up its data and resumes execution in a different host 118 specified by the command.

The management service 130 can analyze the host utilization data 218 reported by the collector VM 131 for respective hosts 118 and generate a respective utilization metric for the hosts 118. The utilization metric can represent a score that embodies the overall utilization of the host 118 that takes into the account the collected utilization data across the various aspects of the host utilization. In one example, the utilization metric can be a measure of CPU utilization. The CPU utilization measure can be a percentage of maximum CPU utilization over a period of time. In another example, the utilization metric can also be a measure of GPU utilization. The GPU utilization measure can also be a percentage of maximum GPU utilization over a period of time. In some examples, the utilization metric can be a weighted combination of GPU and CPU utilization that is calculated into a single utilization metric. The respective utilizations can be weighted based upon a cost factor, which takes into account the cost to acquire, operate, or replace CPU or GPU resources in the datacenter, respectively. The utilization metric can be analyzed by ranking the hosts 118 by the degree of utilization represented in their respective utilization metrics. Highly utilized hosts 118 can be relieved of one or more workloads or additional hosts 118 can be assigned to a particular workload that is causing high utilization.

The utilization metric can also be plotted in a three-dimensional heatmap. The heatmap can be generated by assigning server parameters to each of the three axes in the heatmap. In one example, each of the three axes can be associated with a particular octet from an internet protocol (IP) address of the respective host machines. For example, the X-axis can be associated with the second octet of the IP address, the Y-axis can be assigned to the third octet of the IP address, and the Z-axis can be associated with the fourth octet of the IP address. Accordingly, in this framework, each host 118 can be assigned a point in a three-dimensional space defined by the three-dimensional heatmap. The magnitude of the utilization metric can be plotted in the point corresponding to the host 118. In this way, utilization of hosts 118 can be visualized such that groups or clusters of highly utilized hosts that are close together in terms of a network address can be identified.

The management service 130 can also take one or more remedial actions in response to identifying potential hotspots, or collections of one or more highly utilized hosts 118 in a datacenter. Additionally, the management service 130 can also take one or more remedial actions in response to identifying potential underutilized or unutilized hosts 118 in the datacenter. In one scenario, the management service 130 can alter the behavior of a load balancer for a workload or set of workloads to directly adjust additional loads away from overutilized hosts 118 and towards underutilized hosts 118. In another example, the management service 130 can power down one or more underutilized hosts 118 in the datacenter to reduce electricity consumption of the datacenter. In this example, the shutting down of underutilized hosts 118 can cause other hosts 118 to become more heavily utilized, but this additional utilization combined with the powering down of hosts 118 can reduce electricity costs. The underutilized hosts 118 can also have new workloads or new requests to them as a result of identifying their underutilization.

Figure 3:
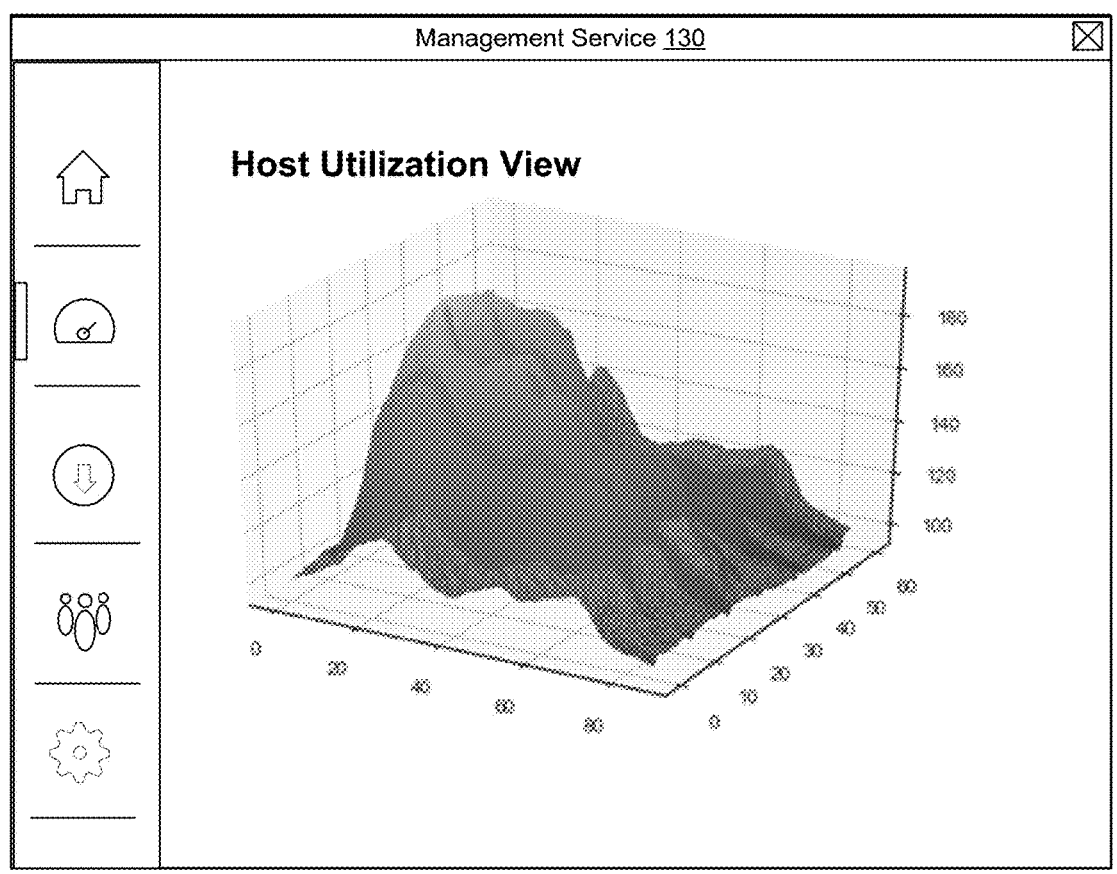
FIG. 3 is an example of a user interface rendered by components of the datacenter environment according to various embodiments of the present disclosure.

Referring to FIG. 3, shown is an example user interface 300 in which a heatmap that plots or shows host 118 utilization is shown. The user interface 300 can be generated by the management service 130 for an administrator. The user interface 300 can allow a user to visualize management information about a datacenter, such as a SDDC associated with an enterprise. In the depicted example, a three-dimensional heatmap is shown. Each of the three axes can represent a different parameter by which hosts 118 can be categorized. By plotting a three-dimensional heatmap in which utilization is shown, an administrator can visualize those portions of the datacenter in which utilization is high and in which utilization is low. Utilization can be visualized by color or shading so that the administrator can quickly ascertain which portions of the datacenter are associated with high utilization and which portions of the datacenter are associated with lower utilization. Those points on a three dimensional plot that are associated with high utilization can be shown in a color or shading pattern associated with high utilization, and those with low utilization can be shown in a color or shading pattern associated with low utilization. Accordingly, utilization can be visualized by an administrator and hotspots identified by color or shading.

Figure 4:
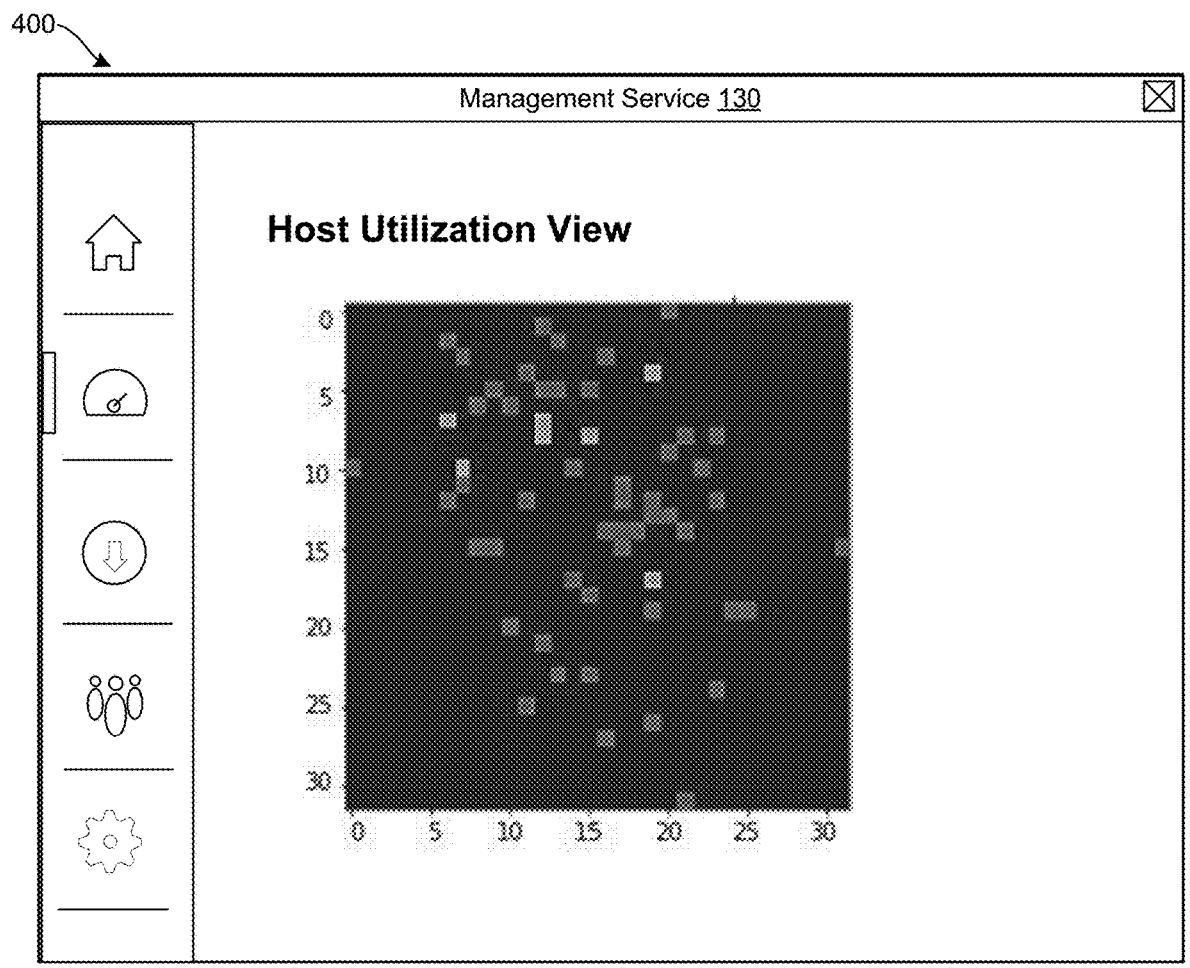
FIG. 4 is an example of a user interface rendered by components of the datacenter environment according to various embodiments of the present disclosure.

Referring to FIG. 4, shown is an example user interface 400 in which a heatmap that visualizes or plots host 118 utilization is shown. The user interface 400 can be generated by the management service 130 for an administrator. The user interface 400 can allow a user to visualize management information about a datacenter, such as a SDDC associated with an enterprise. In the depicted example, a two-dimensional heatmap is shown. Each of the two axes can represent a different parameter by which hosts 118 can be categorized. For example, the X-axis can represent a first octet from an IP address of a host 118 and the Y-axis can represent a different octet from the IP address of the host 118. By plotting a two-dimensional heatmap in which utilization is shown, an administrator can visualize those portions of the datacenter in which utilization is high and in which utilization is low. As in the case of FIG. 3, utilization can be visualized by color or shading so that the administrator can quickly ascertain which portions of the datacenter are associated with high utilization and which portions of the datacenter are associated with lower utilization.

As noted above, the management service 130 can allow an administrator to take one or more remedial actions in response to identifying hot spots or cold spots of host 118 utilization. Visualization of a heat map, whether rendered in three dimensions or two dimensions, can facilitate such remedial actions by allowing an administrator to visualize areas of high utilization in the datacenter.

Figure 5:
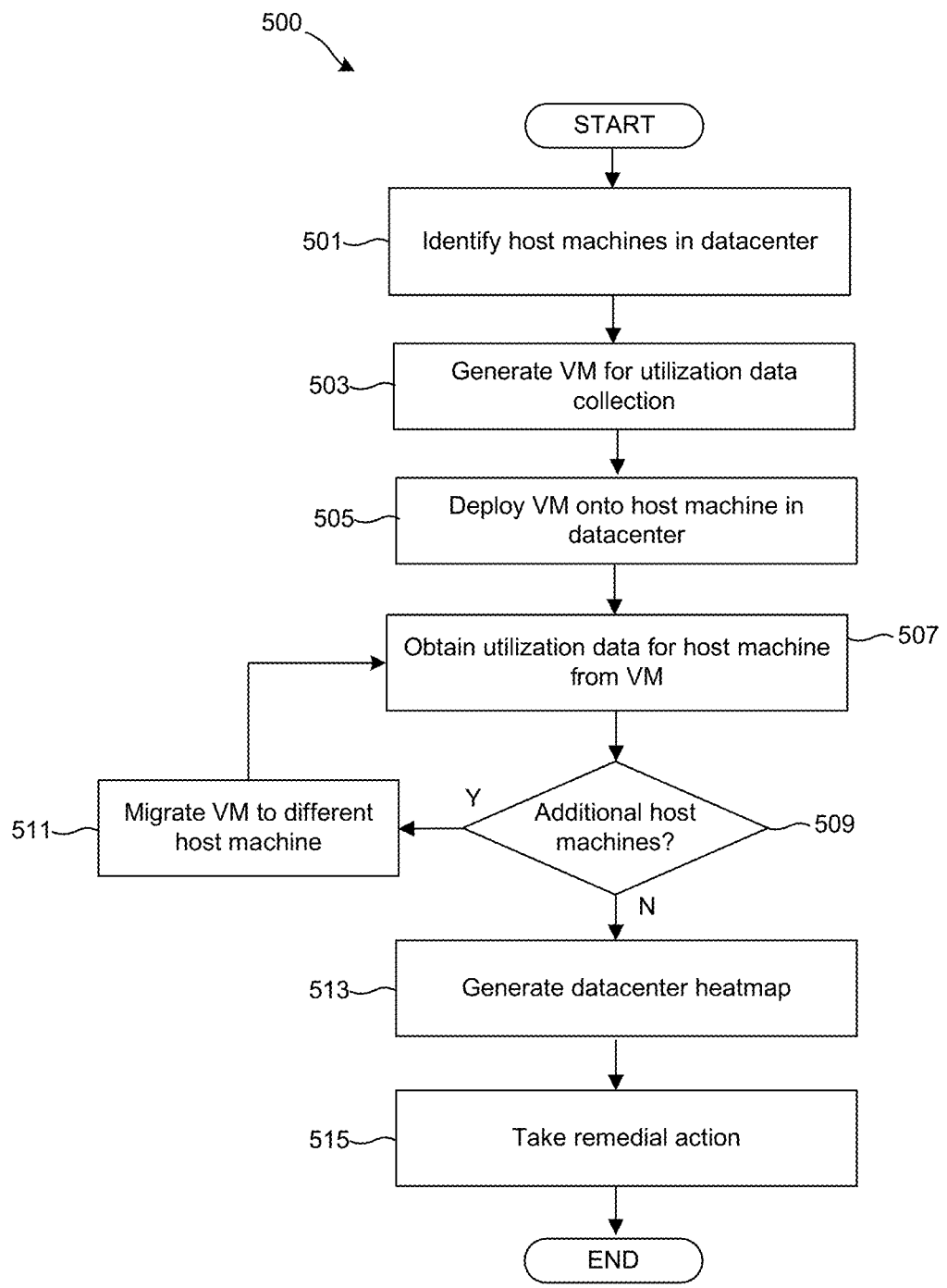
FIG. 5 is an example of a flowchart illustrating functionality implemented by various embodiments of the present disclosure.

Referring to FIG. 5, shown is an example flowchart 500 describing steps that can be performed by the components of the datacenter environment 100 of FIG. 1. Generally, the flowchart 500 describes how the management cluster 129, while executing the management service 130, can generate host utilization heatmaps utilizing a collector VM 131.

In step 501, the management service 130 can identify host machines in a datacenter for which a heatmap is to be generated. The datacenter can correspond to a SDDC or a physical datacenter that utilizes multiple hosts 118. Hosts 118 can respectively be configured to execute at least one workload associated with an enterprise. The workloads can correspond to VMs that are executed in datacenter for various reasons. The workloads can provide VDI services, authentication services, data processing services, or other services in the enterprise.

At step 503, the management service 130 can generate a VM for utilization data collection. The VM can be referred to as the collector VM 131. The collector VM 131 is instrumented to collect utilization metrics from a host machine. The utilization metrics can correspond to memory, vCPU, vGPU, disk, measured throughput, and network utilization by a host 118. The utilization metrics can also correspond to user experience related metrics, such as VDI framerate, VDI I/O latency, or other user experience metrics that can be captured by the collector VM 131. In some cases, the workloads on a host 118 can be instrumented to generate utilization metrics and provide them to collector VM 131.

At step 505, the management service 130 can deploy the collector VM 131 onto a host 118 in the datacenter. The management service 130 can cause the hypervisor on the host 118 to execute the collector VM 131, which can then begin collection of utilization data from the workloads and the host 118. The utilization data can also be collected from the hypervisor running on the host 118.

At step 507, the management service 130 can collect the utilization data from the collector VM 131 running on the host 118 on which it was deployed at step 505. The utilization data can be stored in a data store associated with the datacenter as host utilization data 218. Additionally, the management service 130 can generate a utilization metric from the host utilization data 218 for the host 118, which can later be plotted or visualized in a heatmap.

At step 509, the management service 130 can determine whether there are additional host machines in the datacenter for which host utilization data 218 is sought. In some examples, the collector VM 131 can be configured to sample a subset of hosts 118. In other examples, the collector VM 131 can rove all hosts 118 in the datacenter periodically. In some cases, the collector VM 131 can rove all hosts 118 in the datacenter constantly. If there are additional hosts 118 in the datacenter, the process can proceed to step 511.

At step 511, the management service 130 can cause the collector VM 131 to be migrated to a different host 118. The different host 118 can be selected randomly or according to a systematic schedule specified by a user or the management service 130. In another example, the different host 118 can be selected according to a gradient descent algorithm. The process can then return to step 507, where the management service 130 obtains host utilization data 218 from the collector VM 131 for the different host 118.

If there are not additional host machines identified at step 509, the process can proceed to step 513. At step 513, the management service 130 can generate a heatmap for the visualization metric that can be generated from the host utilization data 218 for each host 118. The visualization metric can represent a single metric in which utilization of the host 118 is embodied.

At step 515, the management service 130 can take one or more remedial action in response to generating the heatmap. The management service 130 can take one or more remedial actions in response to identifying potential underutilized or unutilized hosts 118 in the datacenter. In one scenario, the management service 130 can alter the behavior of a load balancer for a workload or set of workloads to direct additional load to underutilized hosts 118 and away from overutilized hosts 118. In another example, the management service 130 can power down one or more underutilized hosts 118 in the datacenter to reduce electricity consumption of the datacenter. In this example, the shutting down of underutilized hosts 118 can cause other hosts 118 to become more heavily utilized, but this additional utilization combined with the powering down of hosts 118 can reduce electricity costs. The underutilized hosts 118 can also have new workloads or new requests to them as a result of identifying their underutilization. Thereafter, the process can proceed to completion.

A number of software components are stored in the memory and executable by a processor. In this respect, the term "executable" means a program file that is in a form that can ultimately be run by the processor. Examples of executable programs can be a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

A client device having a display can also be utilized, upon which a user interface generated by the management service 130, the workload tasks 224, workload tasks 227, workload tasks 230, or another application can be rendered. The client device can also include one or more input/output devices that can include, for example, a capacitive touchscreen or other type of touch input device, fingerprint reader, or keyboard.

Although the management service 130, workload tasks 224, workload tasks 227, workload tasks 230, or another applications and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a computer-readable medium can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system comprising:
   at least one computing device; and
   program instructions stored in memory and executable in the at least one computing device that, when executed by the at least one computing device, direct the at least one computing device to:
      identify a plurality of host machines associated with a software defined datacenter, the host machines respectively configured to execute at least one workload associated with an enterprise;
      generate a virtual machine instrumented to collect utilization data from a particular host machine in which the virtual machine is executed;
      place the virtual machine onto a first one of the host machines, wherein the virtual machine collects the utilization data from the first one of the host machines;
      obtain the utilization data for the first one of the host machines from the virtual machine;
      migrate the virtual machine to at least one other host machine, wherein the virtual machine collects the utilization data from the at least one other host machine;
      obtain the utilization data for the at least one other host machine from the virtual machine;
      generate a utilization metric for respective ones of the host machines based on the utilization data from the first one of the host machines and the at least one other host machine; and
      generate a heatmap for the software defined datacenter, the heatmap plotting the utilization metric for the respective ones of the host machines relative to other host machines within the software defined datacenter.

2. The system of claim 1, wherein the virtual machine is migrated to the at least one other host machine using a random walk algorithm.

3. The system of claim 1, wherein the virtual machine is migrated to the at least one other host machine using a gradient descent algorithm based upon previously identified highly utilized host machines or a systematic grid algorithm.

4. The system of claim 1, wherein the utilization metric is a single metric based upon measured throughput observed on a host machine, measured latency observed on at least one workload on the host machine, or hardware resource utilization observed on the host machine.

5. The system of claim 1, wherein the heatmap for the software defined datacenter is generated by constructing a three-dimensional heatmap, wherein the utilization metric is plotted by a host machine in a first axis, a second axis, and a third axis that are respectively associated with a parameter by which the plurality of host machines can be categorized.

6. The system of claim 5, wherein the first axis, the second axis, and the third axis are associated with a respective octet of a respective internet protocol address of a respective host machine.

7. The system of claim 1, wherein the at least one computing device is further directed to take a remedial action in response to generating the heatmap, the remedial action comprising: adjusting requests from client devices away from a hotspot, powering down at least one host machine that is underutilized in the software defined datacenter, or directing the requests to the at least one host machine that is underutilized.

8. A method comprising:
identifying a plurality of host machines associated with a software defined datacenter, the host machines respectively configured to execute at least one workload associated with an enterprise;
generating a virtual machine instrumented to collect utilization data from a particular host machine in which the virtual machine is executed;
placing the virtual machine onto a first one of the host machines, wherein the virtual machine collects the utilization data from the first one of the host machines;
obtaining the utilization data for the first one of the host machines from the virtual machine;
migrating the virtual machine to at least one other host machine, wherein the virtual machine collects the utilization data from the at least one other host machine;
obtaining the utilization data for the at least one other host machine from the virtual machine;
generating a utilization metric for respective ones of the host machines based on the utilization data from the first one of the host machines and the at least one other host machine; and
generating a heatmap for the software defined datacenter, the heatmap plotting the utilization metric for the respective ones of the host machines relative to other host machines within the software defined datacenter.

9. The method of claim 8, wherein the virtual machine is migrated to the at least one other host machine using a random walk algorithm.

10. The method of claim 8, wherein the virtual machine is migrated to the at least one other host machine using a gradient descent algorithm based upon previously identified highly utilized host machines or a systematic grid algorithm.

11. The method of claim 8, wherein the utilization metric is a single metric based upon measured throughput observed on a host machine, measured latency observed on at least one workload on the host machine, or hardware resource utilization observed on the host machine.

12. The method of claim 8, wherein the heatmap for the software defined datacenter is generated by constructing a three-dimensional heatmap, wherein the utilization metric is plotted by a host machine in a first axis, a second axis, and a third axis that are respectively associated with a parameter by which the host machines can be categorized.

13. The method of claim 12, wherein the first axis, the second axis, and the third axis are associated with a respective octet of a respective internet protocol address of a respective host machine.

14. The method of claim 8, further comprising taking a remedial action in response to generating the heatmap, the remedial action comprising: adjusting requests from client devices away from a hotspot, powering down at least one host machine that is underutilized in the software defined datacenter, or directing requests to the at least one host machine that is underutilized.

15. A non-transitory computer-readable medium embodying program instructions that, when executed on at least one computing device, direct the at least one computing device to:
identify a plurality of host machines associated with a software defined datacenter, the host machines respectively configured to execute at least one workload associated with an enterprise;
generate a virtual machine instrumented to collect utilization data from a particular host machine in which the virtual machine is executed;
place the virtual machine onto a first one of the host machines, wherein the virtual machine collects the utilization data from the first one of the host machines;
obtain the utilization data for the first one of the host machines from the virtual machine;
migrate the virtual machine to at least one other host machine, wherein the virtual machine collects the utilization data from the at least one other host machine;
obtain the utilization data for the at least one other host machine from the virtual machine;
generate a utilization metric for respective ones of the host machines based on the utilization data from the first one of the host machines and the at least one other host machine; and
generate a heatmap for the software defined datacenter, the heatmap plotting the utilization metric for the respective ones of the host machines relative to other host machines within the software defined datacenter.

16. The non-transitory computer-readable medium of claim 15, wherein the virtual machine is migrated to the at least one other host machine using a random walk algorithm.

17. The non-transitory computer-readable medium of claim 15, wherein the virtual machine is migrated to the at least one other host machine using a gradient descent algorithm based upon previously identified highly utilized host machines or a systematic grid algorithm.

18. The non-transitory computer-readable medium of claim 15, wherein the utilization metric is a single metric based upon measured throughput observed on a host machine, measured latency observed on at least one workload on the host machine, or hardware resource utilization observed on the host machine.

19. The non-transitory computer-readable medium of claim 15, wherein the heatmap for the software defined is generated by constructing a three-dimensional heatmap, wherein the utilization metric is plotted by a host machine in a first axis, a second axis, and a third axis that are respectively associated with a parameter by which the host machines can be categorized.

20. The non-transitory computer-readable medium of claim 15, wherein the at least one computing device is further directed to take a remedial action in response to generating the heatmap, the remedial action comprising: adjusting requests from client devices away from a hotspot, powering down at least one host machine that is underutilized in the software defined datacenter, or directing requests to the at least one host machine that is underutilized.

* * * * *